(12) United States Patent
Wang et al.

(10) Patent No.: US 12,449,505 B2
(45) Date of Patent: Oct. 21, 2025

(54) DETECTION SIGNAL TRANSMITTING METHOD AND APPARATUS, AND STORAGE MEDIUM

(71) Applicant: SHENZHEN YINWANG INTELLIGENT TECHNOLOGIES CO., LTD., Shenzhen (CN)

(72) Inventors: Zhixi Wang, Munich (DE); Fang Wei, Shanghai (CN); Leilei Xu, Shanghai (CN); Boya Qin, Shanghai (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 313 days.

(21) Appl. No.: 17/848,681

(22) Filed: Jun. 24, 2022

(65) Prior Publication Data

US 2022/0326345 A1    Oct. 13, 2022

Related U.S. Application Data

(63) Continuation of application No. PCT/CN2020/121504, filed on Oct. 16, 2020.

(30) Foreign Application Priority Data

Dec. 25, 2019   (CN) .......................... 201911358183.3

(51) Int. Cl.
*G01S 7/02* (2006.01)
*G01S 13/931* (2020.01)
(52) U.S. Cl.
CPC ............ *G01S 7/023* (2013.01); *G01S 13/931* (2013.01)

(58) Field of Classification Search
CPC ...... G01S 7/2813; G01S 7/023; G01S 7/0232; G01S 2013/0245; G01S 2013/0254; G01S 13/931

(Continued)

(56) References Cited

U.S. PATENT DOCUMENTS 4,990,920 A * 2/1991 Sanders, Jr. .............. G01S 7/38
342/14
5,008,678 A * 4/1991 Herman ................ G01S 13/931
342/158

(Continued)

FOREIGN PATENT DOCUMENTS

| CN | 101398479 A | 4/2009 |
| CN | 107110969 A | 8/2017 |

(Continued)

OTHER PUBLICATIONS

Extended European Search Report in European Appln No. 20904713.3, dated Dec. 22, 2022, 17 pages.

(Continued)

*Primary Examiner* — Michael W Justice
(74) *Attorney, Agent, or Firm* — Fish & Richardson P.C.

(57) ABSTRACT

This application provides example detection signal transmitting methods, detection apparatuses, and storage medium. One example method includes determining an orientation of a field of view of a detection apparatus. One of a plurality of anti-interference parameters can then be selected as a target anti-interference parameter based on the orientation of the field of view of the detection apparatus and according to a predefined rule, where the plurality of anti-interference parameters are determined according to the predefined rule. A detection signal can then be transmitted based on the target anti-interference parameter.

18 Claims, 6 Drawing Sheets

(58) Field of Classification Search
USPC .................................... 342/129, 128, 175
See application file for complete search history.

(56) References Cited

U.S. PATENT DOCUMENTS

| | | | | |
|---|---|---|---|---|
| 5,343,211 | A * | 8/1994 | Kott ...................... | G01S 7/2813 342/381 |
| 5,497,162 | A | 3/1996 | Kaiser | |
| 6,292,725 | B1 | 9/2001 | Kageyama et al. | |
| 6,894,641 | B2 * | 5/2005 | Uehara .................... | G01S 7/36 342/91 |
| 7,024,680 | B2 * | 4/2006 | Howard ................ | H04L 1/0006 455/423 |
| 7,079,812 | B2 * | 7/2006 | Miller ................... | H04L 1/0001 370/395.42 |
| 7,292,656 | B2 * | 11/2007 | Kloper ................. | H04L 1/1664 375/228 |
| 7,334,253 | B2 * | 2/2008 | Howard .................... | H04L 1/20 725/111 |
| 7,418,240 | B2 * | 8/2008 | Hsu ....................... | H04L 1/0003 455/67.11 |
| 7,606,335 | B2 * | 10/2009 | Kloper ................. | H04W 16/14 375/228 |
| 7,650,239 | B2 * | 1/2010 | Samukawa ........... | G01S 17/931 356/28 |
| 7,663,533 | B2 * | 2/2010 | Toennesen ........... | H01Q 25/002 342/70 |
| 8,095,074 | B2 * | 1/2012 | Wu ...................... | H04B 7/0697 455/562.1 |
| 8,121,044 | B2 * | 2/2012 | Kwon ................... | H04L 5/0016 370/335 |
| 8,504,052 | B2 * | 8/2013 | Hakola ............... | H04W 52/386 455/452.2 |
| 8,526,886 | B2 * | 9/2013 | Wu ...................... | H04B 7/0697 455/562.1 |
| 9,223,009 | B1 * | 12/2015 | Wasiewicz ............. | G01S 13/24 |
| 10,067,221 | B2 * | 9/2018 | Ginsburg ................ | G01S 7/40 |
| 10,139,473 | B2 * | 11/2018 | Soga ..................... | G01S 7/0236 |
| 10,386,458 | B2 * | 8/2019 | Kim ..................... | G01S 13/931 |
| 10,564,255 | B2 * | 2/2020 | Bechter ................ | G01S 7/023 |
| 10,605,911 | B1 * | 3/2020 | Parker ..................... | G01S 13/42 |
| 10,627,507 | B1 * | 4/2020 | Parker ................... | H01Q 25/00 |
| 10,775,489 | B2 * | 9/2020 | Rao ...................... | G01S 13/931 |
| 10,830,867 | B2 * | 11/2020 | Lin ...................... | G01S 13/86 |
| 10,877,145 | B2 * | 12/2020 | Giere ........................ | G01S 7/03 |
| 11,125,854 | B2 * | 9/2021 | Ray ...................... | G01S 13/825 |
| 11,226,407 | B2 * | 1/2022 | Manocha .............. | G01S 13/931 |
| 11,320,525 | B2 * | 5/2022 | Wada ..................... | H04K 3/226 |
| 11,385,323 | B2 * | 7/2022 | Gulati ................. | H04J 13/0062 |
| 11,385,326 | B2 * | 7/2022 | Völkel ............... | H01Q 15/0086 |
| 11,495,877 | B2 * | 11/2022 | Pelletti ................. | H01Q 21/064 |
| 11,644,529 | B2 * | 5/2023 | Gulati ................. | G01S 13/343 342/173 |
| 11,852,749 | B2 * | 12/2023 | Harrison ............... | G01S 13/426 |
| 2002/0086641 | A1 * | 7/2002 | Howard .............. | H04L 12/2801 455/67.11 |
| 2004/0095269 | A1 * | 5/2004 | Uehara ................... | G01S 7/023 342/159 |
| 2004/0203392 | A1 * | 10/2004 | Hsu ....................... | H04L 1/0003 455/62 |
| 2004/0203474 | A1 * | 10/2004 | Miller ................... | H04L 1/0001 455/63.1 |
| 2005/0002473 | A1 * | 1/2005 | Kloper ................. | H04W 16/14 375/316 |
| 2006/0141971 | A1 * | 6/2006 | Howard .................... | H04L 1/20 455/283 |
| 2007/0200747 | A1 * | 8/2007 | Okai ..................... | G01S 7/0235 342/159 |
| 2007/0222662 | A1 * | 9/2007 | Toennesen ............ | G01S 13/931 342/27 |
| 2008/0007707 | A1 * | 1/2008 | Kim ........................ | G01C 3/08 359/211.2 |
| 2008/0019464 | A1 * | 1/2008 | Kloper ................. | G01R 23/16 375/E7.279 |
| 2008/0061891 | A1 | 3/2008 | Hongo | |
| 2008/0107087 | A1 * | 5/2008 | Kwon ................... | H04L 5/0062 370/335 |
| 2009/0318088 | A1 * | 12/2009 | Wu ...................... | H04B 7/0697 455/63.4 |
| 2011/0275382 | A1 * | 11/2011 | Hakola ................. | H04W 24/10 455/452.2 |
| 2012/0077530 | A1 * | 3/2012 | Wu ...................... | H04B 7/0697 455/501 |
| 2015/0212195 | A1 | 7/2015 | Lee | |
| 2016/0223644 | A1 * | 8/2016 | Soga ..................... | G01S 7/0234 |
| 2016/0291130 | A1 * | 10/2016 | Ginsburg ................ | G01S 13/32 |
| 2017/0343646 | A1 * | 11/2017 | Bechter ................. | G01S 13/931 |
| 2017/0363712 | A1 * | 12/2017 | Kim ..................... | G01S 7/0232 |
| 2018/0172813 | A1 * | 6/2018 | Rao ..................... | G01S 13/343 |
| 2018/0313952 | A1 * | 11/2018 | Giere .................... | G01S 7/0232 |
| 2018/0356508 | A1 * | 12/2018 | Manocha ................ | G01S 13/42 |
| 2019/0056476 | A1 * | 2/2019 | Lin ...................... | G01S 7/021 |
| 2019/0195985 | A1 * | 6/2019 | Lin ...................... | G01S 7/0233 |
| 2019/0212427 | A1 * | 7/2019 | Wada ....................... | G01S 13/24 |
| 2019/0293748 | A1 * | 9/2019 | Gulati ..................... | G01S 7/023 |
| 2019/0391247 | A1 * | 12/2019 | Gulati .................. | G01S 13/341 |
| 2020/0058987 | A1 * | 2/2020 | Pelletti ................. | G01S 13/931 |
| 2020/0309897 | A1 * | 10/2020 | Ray ..................... | G01S 13/876 |
| 2020/0333431 | A1 * | 10/2020 | Völkel .................... | G01S 13/426 |
| 2021/0156982 | A1 * | 5/2021 | Stettiner ................. | G01S 7/35 |
| 2022/0342034 | A1 * | 10/2022 | Völkel ................... | G01S 13/426 |

FOREIGN PATENT DOCUMENTS

| | | |
|---|---|---|
| CN | 107167797 A | 9/2017 |
| CN | 109856603 A | 6/2019 |
| GB | 2299722 A | 10/1996 |
| KR | 100208503 B1 | 7/1999 |
| WO | 2008082973 A1 | 7/2008 |
| WO | 2019202801 A1 | 10/2019 |

OTHER PUBLICATIONS

International Search Report and Written Opinion in International Appln. No. PCT/CN2020/121504, mailed on Jan. 18, 2021, 16 pages (with English translation).

Office Action in Chinese Appln. No. 201911358183.3, dated May 7, 2023, 8 pages.

* cited by examiner

DETECTION SIGNAL TRANSMITTING METHOD AND APPARATUS, AND STORAGE MEDIUM

CROSS-REFERENCE TO RELATED APPLICATIONS

This application is a continuation of International Application No. PCT/CN2020/121504, filed on Oct. 16, 2020, which claims priority to Chinese Patent Application No. 201911358183.3, filed on Dec. 25, 2019. The disclosures of the aforementioned applications are hereby incorporated by reference in their entireties.

TECHNICAL FIELD

This application relates to the field of data detection technologies, and in particular, to a detection signal transmitting method and apparatus, and a storage medium.

BACKGROUND

As vehicle collision avoidance systems are gradually popularized, more vehicles are equipped with radars, for example, millimeter-wave radars. In the collision avoidance system, the radar may transmit a detection signal, and detect a reflected signal after the detection signal encounters an obstacle, to calculate a relative speed and a distance between a vehicle and the obstacle. When the vehicle enters a dangerous range, the collision avoidance system generates a warning to the vehicle, to reduce a danger occurrence probability. Currently, a vehicle with the collision avoidance system usually uses radars using a same transmit frequency band, for example, a transmit frequency band of 76 GHz to 81 GHz. Therefore, when the vehicle runs, interference between the radars is increasingly severe, and how to eliminate the interference between the radars has become an important issue currently concerned.

In a related technology, after receiving the reflected signal, the radar may detect, by using a time domain energy detection method or a time domain differential detection method, whether an interference signal exists in the reflected signal. If the interference signal exists, the interference signal in the reflected signal may be suppressed, and the relative speed and the distance between the vehicle and the obstacle are determined by using a suppressed reflected signal, to eliminate the interference. However, in the foregoing method, some real reflected signals may be lost when the interference signal is suppressed. Consequently, accuracy of a relative speed and a distance that are finally determined is relatively low.

SUMMARY

This application provides a detection signal transmitting method and apparatus, and a storage medium, to resolve a problem in a related technology that accuracy of a relative speed and a distance that are determined is relatively low because some real reflected signals may be lost when an interference signal is suppressed. The technical solutions are as follows.

According to a first aspect, a detection signal transmitting method is provided. The method includes: determining an orientation of a field of view of a detection apparatus; selecting one of a plurality of anti-interference parameters as a target anti-interference parameter based on the orientation of the field of view of the detection apparatus and according to a predefined rule, where the plurality of anti-interference parameters are determined according to the predefined rule; and transmitting a detection signal based on the target anti-interference parameter.

In this embodiment of this application, the target anti-interference parameter is selected from the plurality of anti-interference parameters based on the orientation of the field of view of the detection apparatus and according to the predefined rule, and the plurality of anti-interference parameters are determined according to the predefined rule. Therefore, different orientations of the field of view of the detection apparatus indicate different selected target anti-interference parameters. Based on this, no interference is generated between detection signals transmitted by a plurality of detection apparatuses with different orientations of fields of view based on respective corresponding target anti-interference parameters. In this way, the detection apparatus can accurately receive a reflected signal after the detection signal transmitted by the detection apparatus encounters an obstacle, so that accuracy of a relative speed and a distance that are finally determined is relatively high.

Optionally, the predefined rule includes a correspondence between a first azimuth and a first anti-interference parameter, and the first anti-interference parameter is one of the plurality of anti-interference parameters.

The selecting one of a plurality of anti-interference parameters as a target anti-interference parameter based on the orientation of the field of view of the detection apparatus and according to a predefined rule includes:

determining the first anti-interference parameter as the target anti-interference parameter when the orientation of the field of view of the detection apparatus falls within the first azimuth.

In some embodiments, the orientation of the field of view of the detection apparatus may be compared with a plurality of azimuths included in the predefined rule. It is assumed that the predefined rule includes the correspondence between the first azimuth and the first anti-interference parameter, and the first anti-interference parameter is one of the plurality of anti-interference parameters. The first anti-interference parameter may be determined as the target anti-interference parameter when the orientation of the field of view of the detection apparatus falls within the first azimuth.

Optionally, two adjacent azimuths overlap. The method further includes: determining the first anti-interference parameter as the target anti-interference parameter when the orientation of the field of view of the detection apparatus changes and does not exceed a first threshold of a boundary of the first azimuth.

Because a current motion direction of a vehicle continuously changes, the orientation of the field of view of the detection apparatus also continuously changes accordingly. In addition, when the current motion direction of the vehicle changes on the edges of two adjacent azimuths, the orientation of the field of view of the detection apparatus also changes on the edges of the two adjacent azimuths. As a result, the target anti-interference parameter frequently changes between anti-interference parameters corresponding to the two adjacent azimuths. Therefore, when two adjacent azimuths overlap, although the orientation of the field of view of the detection apparatus changes, the first anti-interference parameter may continue to be determined as the target anti-interference parameter when the orientation of the field of view of the detection apparatus does not exceed the first threshold of the boundary of the first azimuth. In this way, the vehicle can be prevented from frequently changing the target anti-interference parameter in a motion process.

In other words, the first threshold is a threshold that can prevent the target anti-interference parameter of the detection apparatus from frequently changing. When the plurality of azimuths are determined in a manner of average division, the first threshold may be an overlapping angle between two adjacent azimuths. Certainly, the first threshold may alternatively be less than an overlapping angle between two adjacent azimuths. However, when the plurality of azimuths are not determined in a manner of average division, the first threshold may be less than or equal to an average value of all overlapping angles. Certainly, the first threshold may alternatively be a smallest value or a largest value of all overlapping angles. Alternatively, first thresholds of boundaries of different azimuths may be different. This is not limited in this embodiment of this application.

Optionally, two adjacent azimuths do not overlap. The predefined rule further includes a correspondence between a second azimuth and a second anti-interference parameter. The second anti-interference parameter is one of the plurality of anti-interference parameters other than the first anti-interference parameter. The method further includes: determining the second anti-interference parameter as the target anti-interference parameter when the orientation of the field of view of the detection apparatus changes and falls within the second azimuth.

When a current motion direction of a vehicle changes, the orientation of the field of view of the detection apparatus also changes correspondingly. In this case, a changed orientation of the field of view of the detection apparatus may be determined according to the method described in the foregoing step. When it is determined, by using the foregoing method, that the orientation of the field of view of the detection apparatus falls within the second azimuth, the second anti-interference parameter corresponding to the second azimuth may be used as the target anti-interference parameter. To be specific, in a case in which two adjacent azimuths do not overlap, when the orientation of the field of view of the detection apparatus falls within an azimuth, an anti-interference parameter corresponding to the azimuth may be directly used as the target anti-interference parameter.

Optionally, any one of the plurality of anti-interference parameters includes one or more of a transmit time period, a transmit moment, a transmit frequency band, a transmit waveform, a modulation code, and an antenna identifier. When the any anti-interference parameter includes the modulation code, different modulation codes in a plurality of modulation codes included in the plurality of anti-interference parameters are orthogonal to each other, and each of the plurality of modulation codes is used to modulate the detection signal. When the any anti-interference parameter includes the antenna identifier, polarization directions of antennas corresponding to different antenna identifiers in a plurality of antenna identifiers included in the plurality of anti-interference parameters are orthogonal to each other, and correspondingly, antennas corresponding to the plurality of antenna identifiers are disposed on the detection apparatus.

In this embodiment of this application, any plurality of the transmit time period, the transmit moment, the transmit frequency band, the transmit waveform, the modulation code, and the antenna identifier are combined, that is, each anti-interference parameter includes the any plurality of the transmit time period, the transmit moment, the transmit frequency band, the transmit waveform, the modulation code, and the antenna identifier, to reduce difficulty in designing the anti-interference parameter, reduce time spent in designing the anti-interference parameter, and better resolve a problem of interference between the detection apparatuses.

Optionally, a plurality of transmit time periods included in the plurality of anti-interference parameters are discontinuous when the any anti-interference parameter includes the transmit time period.

It should be noted that, to achieve a relatively good interference elimination effect, the plurality of transmit time periods included in the plurality of anti-interference parameters may be discontinuous when the any anti-interference parameter includes the transmit time period. To be specific, there is an interval of specific duration between two adjacent transmit time periods. In this way, transmit time periods of detection signals transmitted by different detection apparatuses are not excessively close, to better eliminate interference between the different detection apparatuses.

Optionally, a plurality of transmit moments included in the plurality of anti-interference parameters are discontinuous when the any anti-interference parameter includes the transmit moment.

It should be noted that, to achieve a relatively good interference elimination effect, the plurality of transmit moments included in the plurality of anti-interference parameters may be discontinuous when the any anti-interference parameter includes the transmit moment. To be specific, there is an interval of specific duration between two adjacent transmit moments. In this way, transmit moments of detection signals transmitted by different detection apparatuses are not excessively close, to better eliminate interference between the different detection apparatuses.

Optionally, a plurality of transmit frequency bands included in the plurality of anti-interference parameters are discontinuous when the any anti-interference parameter includes the transmit frequency band.

It should be noted that, to achieve a relatively good interference elimination effect, the plurality of transmit frequency bands included in the plurality of anti-interference parameters may be discontinuous when the any anti-interference parameter includes the transmit frequency band. To be specific, two adjacent transmit frequency bands are spaced by a specific frequency band, and the spacing frequency band may also be referred to as an isolation frequency band or a guard frequency band. In other words, an isolation frequency band may exist between every two adjacent transmit frequency bands in the plurality of transmit frequency bands, and the isolation frequency band is not used as a transmit frequency band of the detection apparatus. In this way, transmit frequency bands for detection signals transmitted by different detection apparatuses are not excessively close to each other, to better eliminate interference between the different detection apparatuses.

According to a second aspect, a detection signal transmitting apparatus is provided. The detection signal transmitting apparatus has a function of implementing behavior of the detection signal transmitting method according to the first aspect. The detection signal transmitting apparatus includes at least one module, and the at least one module is configured to implement the detection signal transmitting method provided in the first aspect.

According to a third aspect, a detection signal transmitting device is provided. The detection signal transmitting device includes a processor and a memory. The memory is configured to: store a program for performing the detection signal transmitting method provided in the first aspect, and store data used to implement the detection signal transmitting method provided in the first aspect. The processor is configured to execute the program stored in the memory. An operation apparatus of the storage device may further include a communication bus, and the communication bus is configured to establish a connection between the processor and the memory.

According to a fourth aspect, a computer-readable storage medium is provided. The computer-readable storage medium stores instructions, and when the instructions are run on a computer, the computer is enabled to perform the detection signal transmitting method according to the first aspect.

According to a fifth aspect, a computer program product including instructions is provided. When the computer program product runs on a computer, the computer is enabled to perform the detection signal transmitting method according to the first aspect.

Technical effects achieved in the second aspect, the third aspect, the fourth aspect, and the fifth aspect are similar to those achieved by corresponding technical means in the first aspect. Details are not described again herein.

The technical solutions provided in this application can bring at least the following beneficial effects:

In embodiments of this application, the target anti-interference parameter is selected from the plurality of anti-interference parameters based on the orientation of the field of view of the detection apparatus and according to the predefined rule, and the plurality of anti-interference parameters are determined according to the predefined rule. Therefore, the different orientations of the field of view of the detection apparatus indicate the different selected target anti-interference parameters. Based on this, no interference is generated between the detection signals transmitted by the plurality of detection apparatuses with the different orientations of the fields of view based on the respective corresponding target anti-interference parameters. In this way, the detection apparatus can accurately receive the reflected signal after the detection signal transmitted by the detection apparatus encounters the obstacle, so that the accuracy of the relative speed and the distance that are finally determined is relatively high.

DESCRIPTION OF EMBODIMENTS

To make the objectives, technical solutions, and advantages of this application clearer, the following further describes the implementations of this application in detail with reference to the accompanying drawings.

Before embodiments of this application are described in detail, application scenarios in embodiments of this application are described first.

In some scenarios, when a detection apparatus is installed on an object, the detection apparatus may transmit a detection signal, and detect a reflected signal after the detection signal encounters an obstacle, to calculate a relative speed and a distance between the object on which the detection apparatus is located and the obstacle. In this way, it may be determined, based on the relative speed and the distance that are calculated, whether the object on which the detection apparatus is located enters a dangerous range. However, for radars using a same transmit frequency band, interference is likely to occur when these radars transmit detection signals on the same transmit frequency band. Consequently, accuracy of a relative speed and a distance that are finally determined is relatively low. Therefore, when fields of view of the detection apparatus are different, different anti-interference parameters may be selected according to a method provided in embodiments of this application to transmit the detection signals, to eliminate the interference between the radars and improve the accuracy of the relative speed and the distance that are finally determined.

For example, for a vehicle in which an anti-collision system is installed, a plurality of radars are installed on the vehicle, and detection signals may be transmitted through the plurality of radars. In addition, each radar may further receive a reflected signal after a detection signal transmitted by the radar encounters an obstacle, to calculate a relative speed and a distance between the vehicle and the obstacle. When the vehicle enters the dangerous range, the collision avoidance system may generate a warning to the vehicle. However, when the plurality of radars on the vehicle use a same transmit frequency band, or the radar on the vehicle and a radar on another neighboring vehicle use a same transmit frequency band, interference between the radars is likely to occur, resulting in low warning accuracy. Therefore, when orientations of fields of view of the radars are different, different anti-interference parameters may be selected according to the method provided in embodiments of this application to transmit the detection signals, to eliminate interference between the radars and improve warning accuracy.

Figure 1:
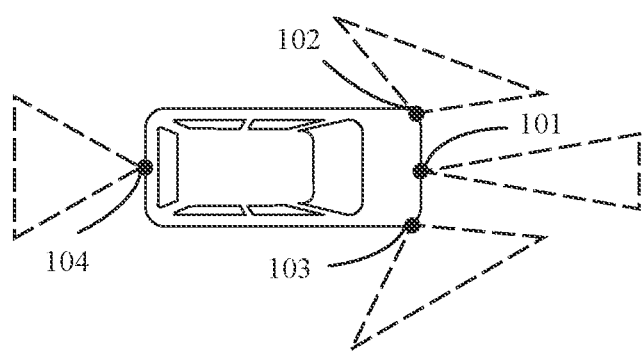
FIG. 1 is a diagram of a system architecture in a detection signal transmitting method according to an embodiment of this application.

In an example, as shown in FIG. 1, the vehicle is equipped with four radars: a first radar 101, a second radar 102, a third radar 103, and a fourth radar 104, and fields of view of the four radars are shown by dashed-line triangles in FIG. 1. If the four radars all use a same transmit frequency band, because the first radar 101, the second radar 102, and the third radar 103 are relatively close to each other, interference is likely to occur when detection signals are transmitted based on the fields of view in FIG. 1, resulting in low warning accuracy. Therefore, according to the method provided in embodiments of this application, different anti-interference parameters may be selected based on orientations of the fields of view of the first radar 101, the second radar 102, and the third radar 103, to transmit the detection signals, so as to eliminate interference between the radars.

Figure 2:
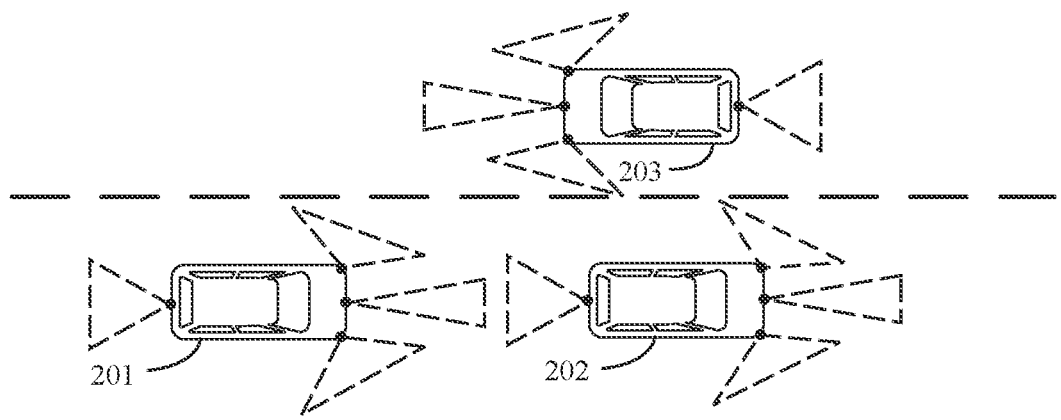
FIG. 2 is a diagram of another system architecture in a detection signal transmitting method according to an embodiment of this application.

In another example, as shown in FIG. 2, a vehicle 201, a vehicle 202, a vehicle 203 each are equipped with four radars, and fields of view of the four radars are respectively shown by dashed-line triangles in FIG. 2. If the radars disposed on the three vehicles all use a same transmit frequency band, because the vehicle 201, the vehicle 202, and the vehicle 203 are relatively close to each other, interference is likely to occur when the radars disposed on the vehicles transmit detection signals based on the fields of view in FIG. 2. In addition, the vehicle 203, the vehicle 201, and the vehicle 202 are separately located in two lanes in opposite driving directions. As a result, interference generated by the detection signal transmitted by the radar disposed on the vehicle 203 causes the vehicle 201 and/or the vehicle 202 to generate a false warning, resulting in low warning accuracy. Therefore, according to the method provided in embodiments of this application, different anti-interference parameters may be selected based on orientations of the fields of view of the radars disposed on the vehicle 201, the vehicle 202, and the vehicle 203, to transmit the detection signal, so as to eliminate interference between the radars of different vehicles.

For another example, for an unmanned aerial vehicle, a plurality of radars are installed on the unmanned aerial vehicle, and detection signals may be transmitted through the plurality of radars. Each radar may further receive a reflected signal after a detection signal transmitted by the radar encounters an obstacle, to calculate a relative speed and a distance between the unmanned aerial vehicle and the obstacle. When the unmanned aerial vehicle enters a dangerous range, a warning is generated to the unmanned aerial vehicle. However, when the plurality of radars on the unmanned aerial vehicle use a same transmit frequency band, or the radar on the unmanned aerial vehicle and a radar on another neighboring unmanned aerial vehicle use a same transmit frequency band, interference between the radars is likely to occur, resulting in low warning accuracy. Therefore, the detection signals may be transmitted according to the method provided in embodiments of this application, to eliminate the interference between the radars and improve warning accuracy.

The foregoing application scenario is merely a possible application scenario provided in this embodiment of this application. Certainly, in some other possible cases, the detection signal transmitting method may also be applied to another scenario. This is not limited in this embodiment of this application.

It should be noted that the method provided in embodiments of this application may be performed by the detection apparatus or a control device. For example, for the vehicle equipped with the plurality of radars, the radars may be used to perform the method provided in embodiments of this application, or a vehicle-mounted terminal on the vehicle may be used as a control device to perform the method provided in embodiments of this application. For example, for the unmanned aerial vehicle equipped with the plurality of radars, the radars may be used to perform the method provided in embodiments of this application, or a controller on the unmanned aerial vehicle may be used as a control device to perform the method provided in embodiments of this application.

Figure 3:
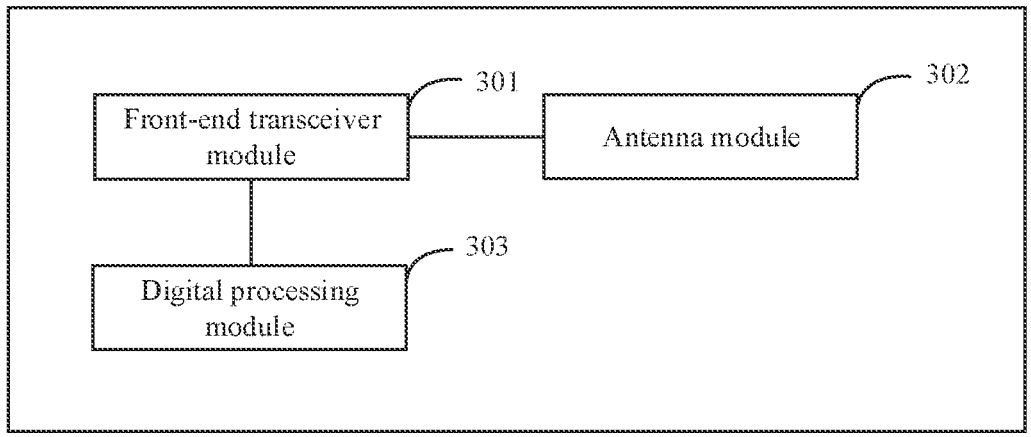
FIG. 3 is a schematic diagram of a structure of a detection apparatus according to an embodiment of this application.

FIG. 3 is a schematic diagram of a structure of a detection apparatus according to an embodiment of this application. The detection apparatus may include a front-end transceiver module 301, an antenna module 302, and a digital processing module 303.

The front-end transceiver module 301 may generate a detection signal, modulate the detection signal, and then transmit a modulated detection signal through the antenna module 302. The front-end transceiver module 301 may further receive, through the antenna module 302, a reflected signal obtained after the detection signal encounters an obstacle, and demodulate the reflected signal.

Different signal processing algorithms may be embedded into the digital processing module 303, and the reflected signals received by the front-end transceiver module 301 may be processed by using the embedded signal processing algorithm. For example, a relative speed and a distance between an object on which the detection apparatus is located and the obstacle may be calculated by using the embedded signal processing algorithm.

Figure 4:
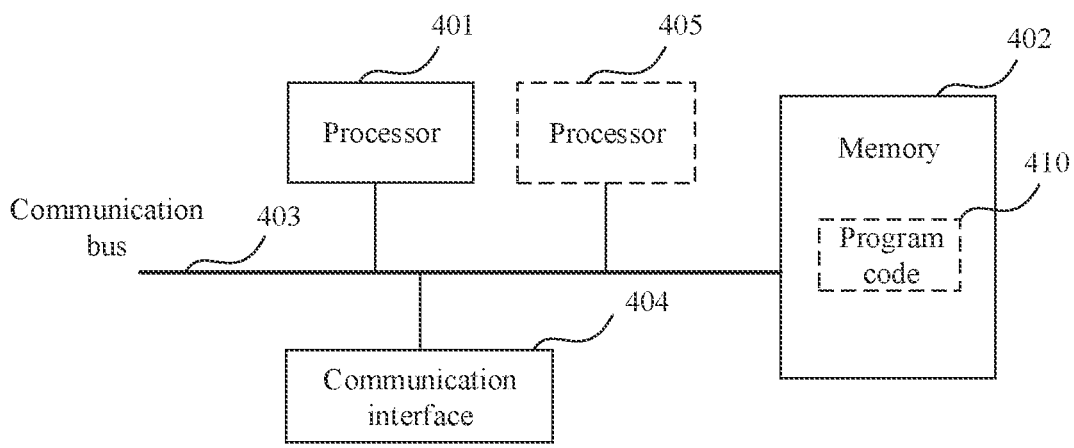
FIG. 4 is a schematic diagram of a structure of a computer device according to an embodiment of this application.

FIG. 4 is a schematic diagram of a structure of a control device according to an embodiment of this application. The control device may include a processor 401 and a memory 402. The memory 402 is configured to store program code 410 for executing the solutions of this application, and the program code includes program instructions. The processor 401 is configured to invoke the program code stored in the memory 402, to implement steps in a method provided in embodiments of this application.

The processor 401 may be a microprocessor (which includes a central processing unit (central processing unit, CPU), and the like) or a network processor (NP), or may be one or more integrated circuits configured to implement the solutions of this application, for example, an application-specific integrated circuit (application-specific integrated circuit, ASIC), a programmable logic device (programmable logic device, PLD), or a combination thereof. The PLD may be a complex programmable logic device (complex programmable logic device, CPLD), a field-programmable gate array (field-programmable gate array, FPGA), generic array logic (generic array logic, GAL), or any combination thereof.

The memory 402 may be a read-only memory (read-only memory, ROM), a random access memory (random access memory, RAM), an electrically erasable programmable read-only memory (electrically erasable programmable read-only memory, EEPROM), an optical disc (which includes a compact disc read-only memory (compact disc read-only memory, CD-ROM), a compact disc, a laser disc, a digital versatile disc, a Blu-ray disc, and the like), a magnetic disk storage medium, another magnetic storage device, or any other medium that can be configured to carry or store expected program code in a form of an instruction or a data structure and that can be accessed by a computer. However, the memory 402 is not limited thereto. The memory 402 may exist independently, and is connected to the processor 401. The memory 402 may alternatively be integrated with the processor 401.

Optionally, the control device may further include a communication bus 403 and a communication interface 404.

The communication bus 403 is configured to transmit information between the foregoing components. The communication bus 403 may be classified into an address bus, a data bus, a control bus, and the like. For ease of representation, only one thick line is used to represent the bus in the figure, but it does not mean that there is only one bus or only one type of bus.

The communication interface 404 is configured to communicate with another device or a communication network by using any apparatus such as a transceiver. The communication interface 404 includes a wired communication interface, and may further include a wireless communication interface. The wired communication interface may be, for example, an Ethernet interface. The Ethernet interface may be an optical interface, an electrical interface, or a combination thereof. The wireless communication interface may be a wireless local area network (wireless local area network, WLAN) interface, a cellular network communication interface, a combination thereof, or the like.

In some embodiments, the control device may include a plurality of processors, for example, the processor 401 and a processor 405 shown in FIG. 4. Each of these processors may be a single-core processor or a multi-core processor. The processor herein may refer to one or more devices, circuits, and/or processing cores configured to process data (for example, computer program instructions).

Figure 5:
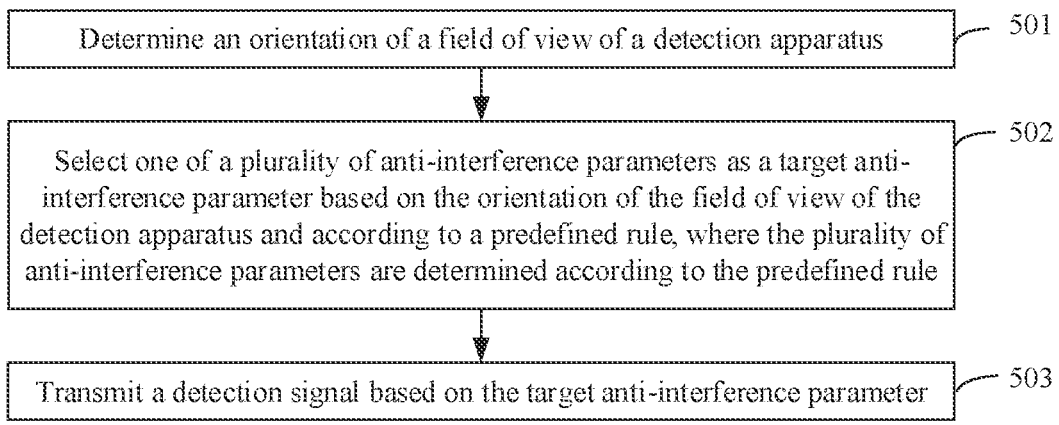
FIG. 5 is a flowchart of a detection signal transmitting method according to an embodiment of this application.

FIG. 5 is a flowchart of a detection signal transmitting method according to an embodiment of this application. The method is applied to a detection apparatus or a control device. Refer to FIG. 5. The method includes the following steps.

The detection apparatus may be installed on a vehicle, or may be installed on another object, for example, an unmanned aerial vehicle. However, regardless of which object the detection apparatus is installed on, a detection signal may be transmitted according to the following method. In addition, a method for transmitting a detection signal by each detection apparatus may be the same, and the following method may be implemented by the detection apparatus or by the control device. Therefore, the following uses the control device as an example to describe a method for transmitting a detection signal by a detection apparatus installed on the vehicle.

Step 501: Determine an orientation of a field of view of the detection apparatus.

In this embodiment of this application, the control device may determine a current motion direction of the vehicle, and determine the orientation of the field of view of the detection apparatus based on the current motion direction of the vehicle and an installation position of the detection apparatus on the vehicle.

It should be noted that the control device stores the installation position of the detection apparatus on the vehicle. For example, the control device may store coordinates of the detection apparatus in a vehicle coordinate system as the installation position of the detection apparatus on the vehicle. The vehicle coordinate system may be a coordinate system in which the center of the vehicle is used as an origin of coordinates, a straight line that passes through the origin of coordinates and is parallel to a vehicle motion direction is used as a y-axis, and a straight line that passes through the origin of coordinates and is perpendicular to the y-axis is used as an x-axis. To be specific, the installation position of the detection apparatus on the vehicle may be a position of the detection apparatus relative to the center of the vehicle. Certainly, the foregoing is merely an example. The installation position of the detection apparatus on the vehicle may alternatively be a position of the detection apparatus relative to another part of the vehicle, for example, a position of the detection apparatus relative to the vehicle front.

After the control device determines the current motion direction of the vehicle, because the current motion direction of the vehicle is a current orientation of the vehicle front, it is equivalent to determining the current orientation of the vehicle front. Then, the position of the detection apparatus relative to the vehicle front may be determined based on the installation position of the detection apparatus on the vehicle, and then the orientation of the field of view of the detection apparatus is determined based on the orientation of the vehicle front and the position of the detection apparatus relative to the vehicle front.

Optionally, the position of the detection apparatus relative to the vehicle front may be represented by an included angle between the center line of a field of view of the detection apparatus at the installation position and the center line of the vehicle front.

Figure 6:
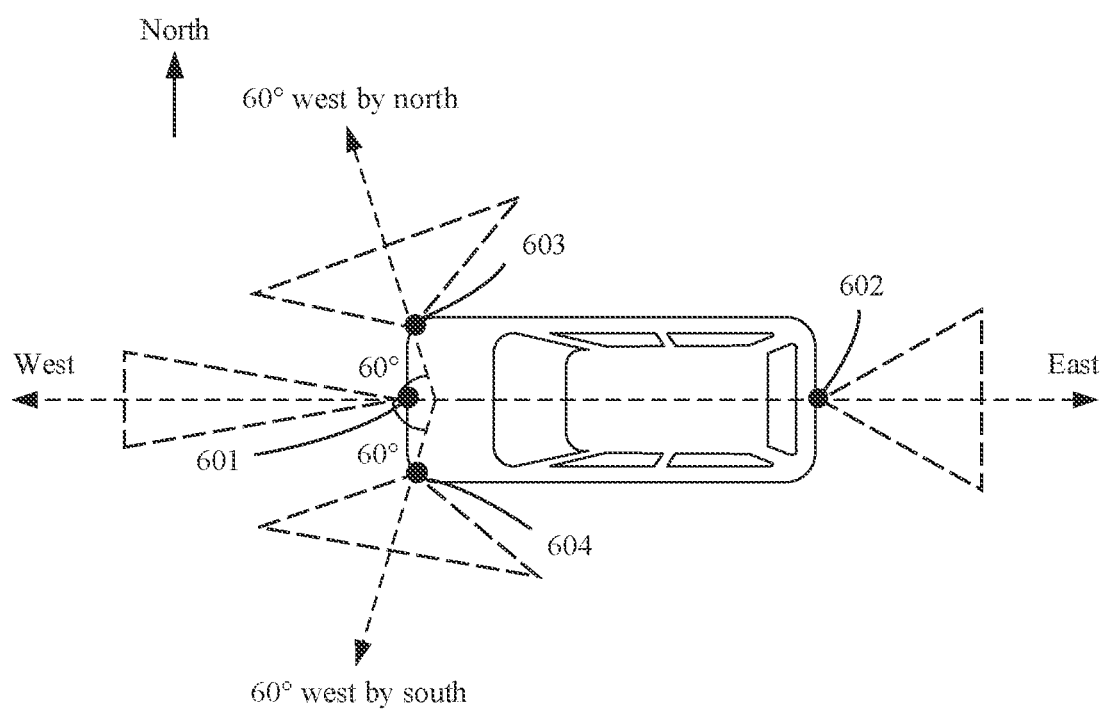
FIG. 6 is a schematic diagram of a current motion direction of a vehicle according to an embodiment of this application.

For example, the current motion direction of the vehicle is shown in FIG. 6. The vehicle is equipped with four detection apparatuses: a detection apparatus 601 located in the vehicle front, a detection apparatus 602 located in the vehicle rear, a detection apparatus 603 located at a right front corner of the vehicle, and a detection apparatus 604 located at the left front corner of the vehicle. It is assumed that the detection apparatus 601 is used as an example. Because the current motion direction of the vehicle is the due-west direction, that is, the orientation of the vehicle front is the due-west direction, and the detection apparatus 601 is installed in the vehicle front, the orientation of the vehicle front is an orientation of a field of view of the detection apparatus 601, that is, the orientation of the field of view of the detection apparatus 601 is the due-west direction. It is assumed that the detection apparatus 604 is used as an example. Because the detection apparatus 604 is located on the left side of the vehicle front, and a position of the detection apparatus 604 relative to the vehicle front is 60 degrees, it may be determined that an orientation of the center line of the field of view of the detection apparatus 604 is 60 degrees west by south. Therefore, it can be determined that the orientation of the field of view of the detection apparatus is west by south.

It should be noted that, because the installation position of the detection apparatus on the vehicle is a location relative to the vehicle, and the current motion direction of the vehicle is an absolute direction, the orientation, determined based on the current motion direction of the vehicle and the installation position of the detection apparatus on the vehicle, of the field of view of the detection apparatus is an absolute direction.

Optionally, the field of view of the detection apparatus is an area that extends outward by using the detection apparatus as a vertex, and an angle and an extended distance of the field of view vary with the detection apparatus. Therefore, in some cases, an orientation of the center line of the field of view of the detection apparatus may be directly used as the orientation of the field of view of the detection apparatus. Similarly, in another possible case, the orientation of the field of view of the detection apparatus may be represented in another manner. This is not limited herein.

Step 502: Select one of a plurality of anti-interference parameters as a target anti-interference parameter based on the orientation of the field of view of the detection apparatus and according to a predefined rule, where the plurality of anti-interference parameters are determined according to the predefined rule.

It should be noted that the control device stores the predefined rule, and the predefined rule includes a correspondence between a plurality of azimuths and the plurality of anti-interference parameters. The plurality of azimuths are obtained after geographic orientations are divided. A quantity of divided azimuths may be greater than or equal to a quantity of detection apparatuses installed on the vehicle.

Two adjacent azimuths in the plurality of azimuths may or may not overlap. In addition, the plurality of azimuths cover each geographic orientation.

Figure 7:
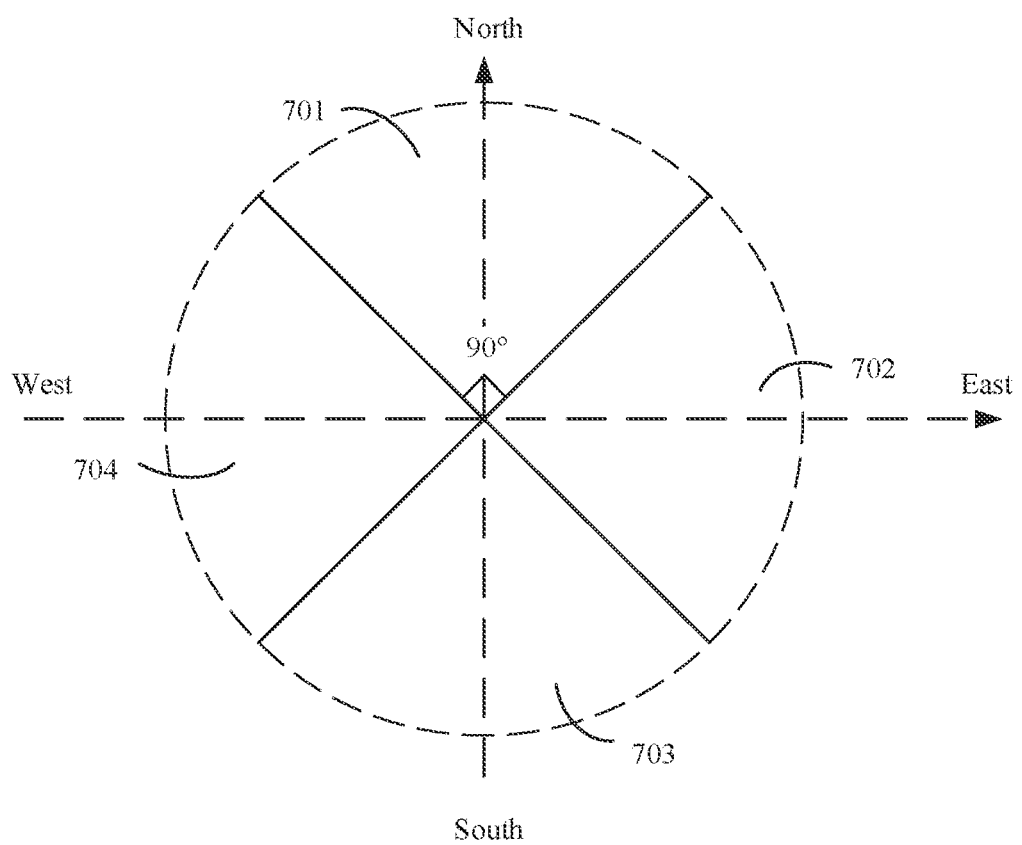
FIG. 7 is a schematic diagram of dividing an azimuth according to an embodiment of this application.

In an example, as shown in FIG. 7, four geographic orientations: the east, the west, the south, and the north, may be used as center lines, and are separately extended by 45 degrees to two sides to form four azimuths, namely, an azimuth 701 facing the north, an azimuth 702 facing the east, an azimuth 703 facing the south, and an azimuth 704 facing the west in FIG. 7, and an angle of each azimuth is 90 degrees. In this case, two adjacent azimuths in the plurality of azimuths do not overlap.

Figure 8:
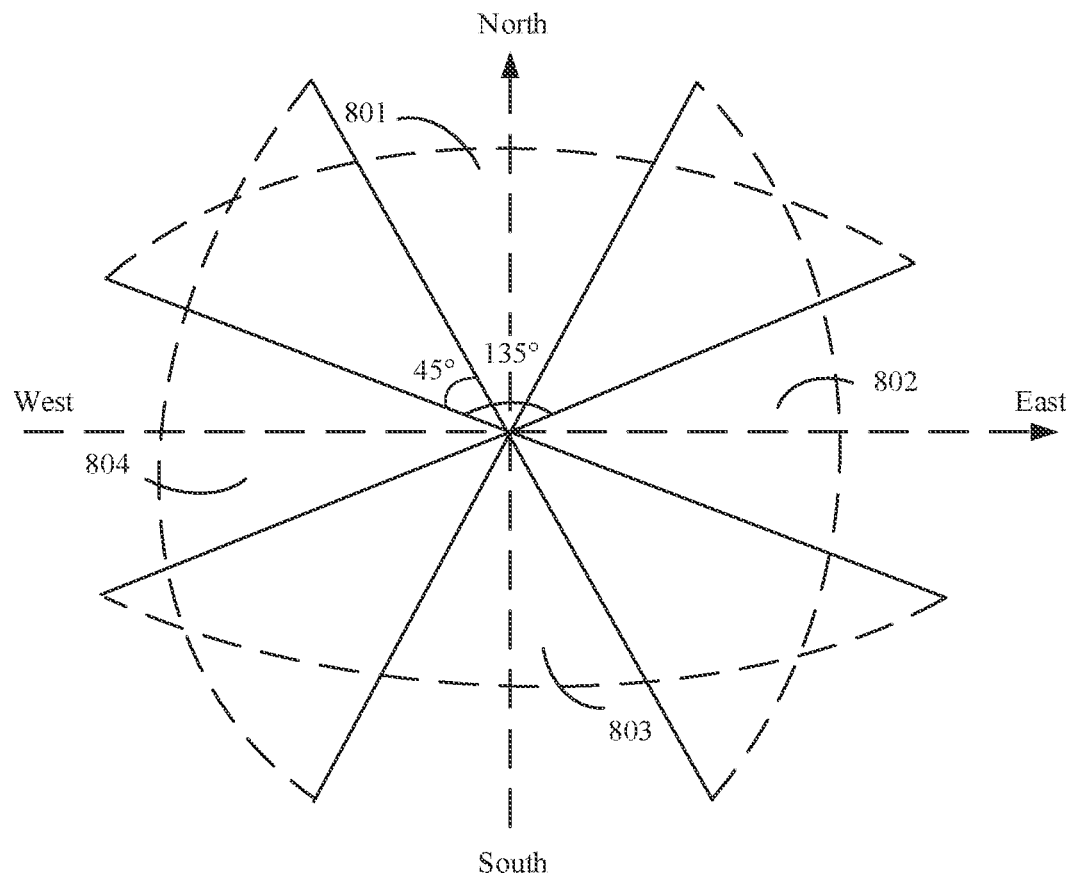
FIG. 8 is another schematic diagram of dividing an azimuth according to an embodiment of this application.

In another example, as shown in FIG. 8, four geographic orientations: the east, the west, the south, and the north, may be used as center lines, and are separately extended by 67.5 degrees to two sides to form four azimuths, namely, an azimuth 801 facing the north, an azimuth 802 facing the east, an azimuth 803 facing the south, and an azimuth 804 facing the west in FIG. 8, and an angle of each azimuth is 135 degrees. In this case, two adjacent azimuths in the plurality of azimuths overlap, and an overlapping angle is 45 degrees.

Based on this, the control device may compare the orientation of the field of view of the detection apparatus with the plurality of azimuths included in the predefined rule. It is assumed that the predefined rule includes a correspondence between a first azimuth and a first anti-interference parameter, and the first anti-interference parameter is one of the plurality of anti-interference parameters. The first anti-interference parameter may be determined as the target anti-interference parameter when the orientation of the field of view of the detection apparatus falls within the first azimuth.

For example, the plurality of azimuths included in the predefined rule are shown in FIG. 7, and the predefined rule is shown in the following Table 1. It is assumed that the control device determines that the orientation of the field of view of the detection apparatus is the due-west direction. In this case, an anti-interference parameter 4 corresponding to the azimuth 704 may be used as the target anti-interference parameter.

TABLE 1

| Azimuth | Anti-interference parameter |
| --- | --- |
| Azimuth 701 | Anti-interference parameter 1 |
| Azimuth 702 | Anti-interference parameter 2 |
| Azimuth 703 | Anii-interference parameter 3 |
| Azimuth 704 | Anti-interference parameter 4 |

It should be noted that, in the foregoing two examples in FIG. 7 and FIG. 8, the azimuths are determined in a manner of average division. In an actual implementation, the azimuths may not be determined in the manner of average division.

As the current motion direction of the vehicle changes, the orientation of the field of view of the detection apparatus also changes. In addition, based on the foregoing description, two adjacent azimuths in the plurality of azimuths may or may not overlap. Therefore, the following describes, in two cases, a method for determining the target anti-interference parameter after the orientation of the field of view of the detection apparatus changes.

In a first case, two adjacent azimuths in the plurality of azimuths do not overlap, the predefined rule further includes a correspondence between a second azimuth and a second anti-interference parameter, and the second anti-interference parameter is one of the plurality of anti-interference parameters other than the first anti-interference parameter. In this case, the second anti-interference parameter may be determined as the target anti-interference parameter when the orientation of the field of view of the detection apparatus changes and falls within the second azimuth.

When the current motion direction of the vehicle changes, the orientation of the field of view of the detection apparatus also changes correspondingly. In this case, the control device may determine a changed orientation of the field of view of the detection apparatus according to the method described in the foregoing step. When it is determined, by using the foregoing method, that the orientation of the field of view of the detection apparatus falls within the second azimuth, the second anti-interference parameter corresponding to the second azimuth may be used as the target anti-interference parameter. To be specific, in the first case, two adjacent azimuths do not overlap, when the orientation of the field of view of the detection apparatus falls within an azimuth, an anti-interference parameter corresponding to the azimuth may be directly used as the target anti-interference parameter.

The plurality of azimuths shown in FIG. 7 are still used as an example, and the foregoing example continues. When the current motion direction of the vehicle changes to 45 degrees west by north, an orientation of the center line of the field of view of the detection apparatus installed in the vehicle front is 45 degrees west by north. In this case, it may be determined that the orientation of the center line of the field of view of the detection apparatus falls within the azimuth 701, and the anti-interference parameter 1 corresponding to the azimuth 701 may be used as the target anti-interference parameter.

In a second case, two adjacent azimuths in the plurality of azimuths overlap. In this case, when the orientation of the field of view of the detection apparatus changes and does not exceed a first threshold of a boundary of the first azimuth, the first anti-interference parameter may be determined as the target anti-interference parameter.

Because the current motion direction of the vehicle continuously changes, the orientation of the field of view of the detection apparatus also continuously changes accordingly. In addition, when the current motion direction of the vehicle changes on edges of two adjacent azimuths, the orientation of the field of view of the detection apparatus also changes on the edges of the two adjacent azimuths. As a result, the target anti-interference parameter frequently changes between anti-interference parameters corresponding to the two adjacent azimuths. Therefore, when two adjacent azimuths overlap, although the orientation of the field of view of the detection apparatus changes, the first anti-interference parameter may continue to be determined as the target anti-interference parameter when the orientation of the field of view of the detection apparatus does not exceed the first threshold of the boundary of the first azimuth. In this way, the vehicle can be prevented from frequently changing the target anti-interference parameter in a motion process.

In other words, the first threshold is a threshold that can prevent the target anti-interference parameter of the detection apparatus from frequently changing. When the plurality of azimuths are determined in the manner of average division, the first threshold may be an overlapping angle between two adjacent azimuths. Certainly, the first threshold may alternatively be less than an overlapping angle between two adjacent azimuths. However, when the plurality of azimuths are not determined in the manner of average division, the first threshold may be less than or equal to an average value of all overlapping angles. Certainly, the first threshold may alternatively be a smallest value or a largest value of all overlapping angles. Alternatively, first thresholds of boundaries of different azimuths may be different. This is not limited in this embodiment of this application.

The plurality of azimuths shown in FIG. 8 are used as an example, and the foregoing example continues. When the current motion direction of the vehicle changes from the due-west direction to 60 degrees west by north, the orientation of the center line of the field of view of the detection apparatus installed in the vehicle front is 60 degrees west by north. Because an overlapping angle between two adjacent azimuths is 45 degrees, it is assumed that the first threshold is 22.5 degrees. In this case, it may be determined that the orientation of the field of view of the detection apparatus does not exceed the first threshold of a boundary of the azimuth 804, that is, the orientation of the field of view of the detection apparatus still falls within the azimuth 804, and an anti-interference parameter 4 corresponding to the azimuth 804 may be used as the target anti-interference parameter.

In this embodiment of this application, any one of the plurality of anti-interference parameters may include one or more of the transmit time period, the transmit moment, the transmit frequency band, the transmit waveform, the modulation code, and the antenna identifier.

The following separately describes the foregoing six parameters.

(1) Transmit Time Period

The control device stores a plurality of transmit time periods, and each transmit time period corresponds to one azimuth. Each transmit time period is used to indicate a time period within which moments at which the detection apparatus transmits the detection signal and receives a reflected signal fall. In other words, both a moment at which the detection apparatus starts to transmit the detection signal and a moment at which the detection apparatus stops receiving the reflected signal fall within the transmit time period.

The plurality of azimuths shown in FIG. 7 are used as an example. The predefined rule is shown in the following Table 2. It is assumed that the orientation of the field of view of the detection apparatus falls within the azimuth 704. In this case, a transmit time period of 3.1 s to 4 s corresponding to the azimuth 704 may be used as the target anti-interference parameter. In this case, the detection apparatus may transmit the detection signal within a time period from 3.1 s to 4 s, and receive the reflected signal within the time period. To be specific, both the moment at which the detection apparatus starts to transmit the detection signal and a moment at which the detection apparatus stops receiving the reflected signal fall within 3.1 s to 4 s.

TABLE 2

| Azimuth | Anti-interference parameter |
| --- | --- |
| Azimuth 701 | 0 s to 1 s |
| Azimuth 702 | 1.1 s to 2 s |
| Azimuth 703 | 2.1 s to 3 s |
| Azimuth 704 | 3.1 s to 4 s |

It should be noted that, to achieve a relatively good interference elimination effect, a plurality of transmit time periods included in a plurality of anti-interference parameters may be discontinuous when the any anti-interference parameter includes the transmit time period. To be specific, there is an interval of specific duration between two adjacent transmit time periods. In this way, transmit time periods of detection signals transmitted by different detection apparatuses are not excessively close, to better eliminate interference between the different detection apparatuses.

(2) Transmit Moment

The control device stores a plurality of transmit moments, and each transmit moment corresponds to one azimuth.

In some embodiments, the transmit moment may include a moment for starting to transmit the detection signal, that is, "hour", "minute", and "second" for starting to transmit the detection signal. In some other embodiments, the transmit moment may include the moment for starting to transmit the detection signal and a moment for stopping receiving the reflected signal, that is, include both the "hour", "minute", and "second" for starting to transmit the detection signal and "hour", "minute", and "second" for stopping transmitting the detection signal.

The plurality of azimuths shown in FIG. 7 are used as an example. The predefined rule is shown in the following Table 3. In the predefined rule shown in Table 3, the transmit moment includes the moment for starting to transmit the detection signal and the moment for stopping receiving the reflected signal. It is assumed that the orientation of the field of view of the detection apparatus falls within the azimuth 704. In this case, a transmit moment 12:00:09 to 12:00:12 corresponding to the azimuth 704 may be used as the target anti-interference parameter. In this case, the detection apparatus may start to transmit the detection signal at 12:00:09, and stop receiving the reflected signal at 12:00:12. To be specific, duration from starting to transmit the detection signal to stopping receiving the reflected signal is 3 s.

TABLE 3

| Azimuth | Anti-interference parameter |
| --- | --- |
| Azimuth 701 | 12:00:00-12:00:03 |
| Azimuth 702 | 12:00:03-12:00:06 |
| Azimuth 703 | 12:00:06-12:00:09 |
| Azimuth 704 | 12:00:09-12:00:12 |

Optionally, "hour" and "minute" included in each transmit moment may not indicate specific "hour" and "minute" for transmitting the detection signal, but a specific transmit moment is indicated by using "second" included in each transmit moment. To be specific, when a corresponding second of each minute of each hour arrives, the detection apparatus may start to transmit the detection signal.

It should be noted that, to achieve a relatively good interference elimination effect, a plurality of transmit moments included in the plurality of anti-interference parameters may be discontinuous when the any anti-interference parameter includes the transmit moment. To be specific, there is an interval of specific duration between two adjacent transmit moments. In this way, transmit moments of detection signals transmitted by different detection apparatuses are not excessively close, to better eliminate interference between the different detection apparatuses.

(3) Transmit Frequency Band

The control device stores a plurality of transmit frequency bands. The plurality of transmit frequency bands are obtained by dividing all frequency bands available to the detection apparatus, the plurality of transmit frequency bands do not overlap, and each transmit frequency band corresponds to one azimuth.

The plurality of azimuths shown in FIG. 7 are still used as an example. It is assumed that all the frequency bands available to the detection apparatus are 76 GHz to 81 GHz. The predefined rule is shown in the following Table 4. It is assumed that the orientation of the field of view of the detection apparatus falls within the azimuth 704. In this case, a transmit frequency band of 79 Hz to 80 Hz corresponding to the azimuth 704 may be used as the target anti-interference parameter. In this case, a transmit frequency band for the detection signal transmitted by the detection apparatus falls within 79 Hz to 80 Hz.

TABLE 4

| Azimuth | Anti-interference parameter |
| --- | --- |
| Azimuth 701 | 76 Hz to 77 Hz |
| Azimuth 702 | 77 Hz to 78 Hz |
| Azimuth 703 | 78 Hz to 79 Hz |
| Azimuth 704 | 79 Hz to 80 Hz |

It should be noted that, to achieve a relatively good interference elimination effect, a plurality of transmit frequency bands included in the plurality of anti-interference parameters may be discontinuous when the any anti-interference parameter includes the transmit frequency band. To be specific, two adjacent transmit frequency bands are spaced by a specific frequency band, and the spacing frequency band may also be referred to as an isolation frequency band or a guard frequency band. In other words, an isolation frequency band may exist between every two adjacent transmit frequency bands in the plurality of transmit frequency bands, and the isolation frequency band is not used as a transmit frequency band of the detection apparatus. In this way, transmit frequency bands for detection signals transmitted by different detection apparatuses are not excessively close to each other, to better eliminate interference between the different detection apparatuses.

Figure 9:
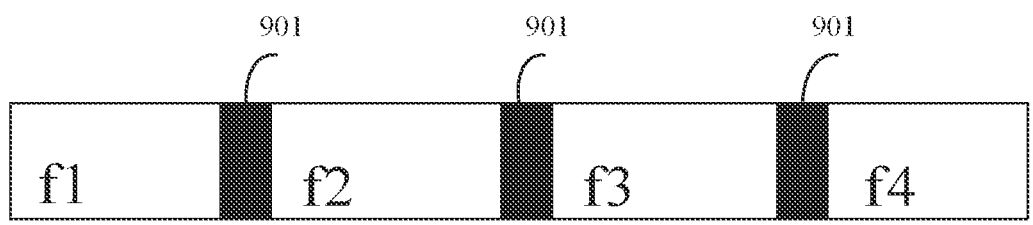
FIG. 9 is a schematic diagram of dividing a transmit frequency band according to an embodiment of this application.

For example, as shown in FIG. 9, an isolation frequency band 901 exists between a transmit frequency band f1 and a transmit frequency band f2, an isolation frequency band 901 exists between a transmit frequency band f2 and a transmit frequency band f3, and an isolation frequency band 901 exists between a transmit frequency band f3 and a transmit frequency band f4. Widths of the plurality of isolation bands 901 may be the same or different. This is not limited in this embodiment of this application.

(4) Transmit Waveform

The control device may store identifiers of a plurality of different waveform libraries. Transmit waveforms in the different waveform libraries are orthogonal to each other, and transmit waveforms in a same waveform library may not be orthogonal to each other. An identifier of each waveform library may correspond to one azimuth, and a waveform in each waveform library refers to a waveform of a detection signal transmitted by a detection apparatus whose orientation falls within an azimuth corresponding to the waveform library.

In an example, the transmit waveform in the waveform library may be a waveform on which phase modulation is performed, for example, two-phase modulation, four-phase modulation, multiphase modulation, and continuous phase modulation.

The plurality of azimuths shown in FIG. 7 are used as an example. The predefined rule is shown in the following Table 5. Transmit waveforms included in four waveform libraries in Table 5 are orthogonal to each other. It is assumed that the orientation of the field of view of the detection apparatus falls within the azimuth 704. In this case, a transmit waveform may be selected from a waveform library 4 corresponding to the azimuth 704 to transmit the detection signal.

TABLE 5

| Azimuth | Anti-interference parameter |
| --- | --- |
| Azimuth 701 | Waveform library 1 |
| Azimuth 702 | Waveform library 2 |
| Azimuth 703 | Waveform library 3 |
| Azimuth 704 | Waveform library 4 |

(5) Modulation Code

When the any anti-interference parameter includes the modulation code, different modulation codes in a plurality of modulation codes included in the plurality of anti-interference parameters are orthogonal to each other, and each of the plurality of modulation codes is used to modulate the detection signal.

In some embodiments, the modulation code may be a modulation code for the transmit waveform. In other words, an initial phase of the detection signal may be modulated by using the modulation code. When a reflected signal is received, the received reflected signal may be demodulated. In this way, a reflected signal corresponding to the detection signal transmitted by the detection apparatus may be obtained, and waveforms of different detection signals may be orthogonal in time domain.

For example, a frequently used modulation code is a Hadamard code, and different Hadamard codes in a plurality of Hadamard codes included in the plurality of anti-interference parameters are orthogonal to each other. A period for modulating the Hadamard code may be selected based on a quantity of azimuths included in the predefined rule. Then, each azimuth corresponds to one Hadamard code, and Hadamard codes corresponding to different azimuths are orthogonal to each other. In this way, it can be ensured that waveforms modulated at different azimuths are orthogonal to each other in time domain.

Optionally, sequences of the detection signals may further be integrally modulated, so that waveforms of reflected signals obtained after the detection signals encounters an obstacle are orthogonal in a Doppler domain. When a step of a frequency of the detection signal is small enough, an initial phase of each sequence may be adjusted to modulate the frequency of the detection signal.

The plurality of azimuths shown in FIG. 7 are used as an example. The predefined rule is shown in the following Table 6. A modulation code 1, a modulation code 2, a modulation code 3, and a modulation code 4 are orthogonal to each other. It is assumed that the orientation of the field of view of the detection apparatus falls within the azimuth 704. In this case, the modulation code 4 corresponding to the azimuth 704 may be used as the target anti-interference parameter.

TABLE 6

| Azimuth | Anti-interference parameter |
| --- | --- |
| Azimuth 701 | Modulation code 1 |
| Azimuth 702 | Modulation code 2 |
| Azimuth 703 | Modulation code 3 |
| Azimuth 704 | Modulation code 4 |

(6) Antenna Identifier

When the any anti-interference parameter includes the antenna identifier, polarization directions of antennas corresponding to different antenna identifiers in a plurality of antenna identifiers included in the plurality of anti-interference parameters are orthogonal to each other, and correspondingly, antennas corresponding to the plurality of antenna identifiers are disposed on the detection apparatus.

The antenna corresponding to the antenna identifier is a transmit antenna. Both the transmit antenna and a receive antenna are disposed on the detection apparatus, and the transmit antenna and the receive antenna do not need to be in a one-to-one correspondence. In other words, a quantity of the transmit antennas and a quantity of the receive antennas may be the same or different.

It should be noted that there are usually only two antennas whose polarization directions are orthogonal to each other in a group, and it is basically impossible that polarization directions of more than two antennas are orthogonal to each other in the group. However, there may be a plurality of groups of two antennas whose polarization directions are orthogonal to each other. In this way, an appropriate group of antennas may be selected from the plurality of groups of antennas that are orthogonal to each other.

For example, polarization directions of an antenna polarized at positive 45 degrees and an antenna polarized at negative 45 degrees are orthogonal to each other, and a horizontally polarized antenna and a vertically polarized antenna are orthogonal to each other. Compared with the horizontally polarized antenna and the vertically polarized antenna, the antenna polarized at positive 45 degrees and the antenna polarized at negative 45 degrees can receive signals from more directions, and have higher diversity gains under a same condition. Therefore, the antenna polarized at positive 45 degrees and the antenna polarized at negative 45 degrees may usually be selected.

In this case, two adjacent azimuths may correspond to different antenna identifiers, and two opposite azimuths may correspond to a same antenna identifier. The plurality of azimuths shown in FIG. 7 are used as an example. The azimuth 701 and the azimuth 703 may correspond to a same antenna identifier, the azimuth 702 and the azimuth 704 may correspond to a same antenna identifier, and the two groups of azimuths may correspond to different antenna identifiers. For example, the azimuth 701 and the azimuth 703 may correspond to the antenna polarized at positive 45 degrees, and the azimuth 702 and the azimuth 704 may correspond to the antenna polarized at negative 45 degrees.

However, when there are a large quantity of azimuths, a specific degree of interference usually still exists between two antennas whose polarization directions are orthogonal. Therefore, in this case, two antennas that are orthogonal to each other and that are disposed on the detection apparatus may be combined with the foregoing another parameter. To be specific, each anti-interference parameter includes both the antenna identifier and the another parameter.

For example, the antenna identifier may be combined with the transmit frequency band. The plurality of azimuths shown in FIG. 7 are used as an example. The predefined rule is shown in the following Table 7. It is assumed that the orientation of the field of view of the detection apparatus falls within the azimuth 704. In this case, an antenna 2 corresponding to the azimuth 704 and a transmit frequency band of 79 Hz to 81 Hz may be used as the target anti-interference parameter. In this case, the detection apparatus may transmit the detection signal through an antenna whose antenna identifier is the antenna 2 in the two disposed antennas, and a transmit frequency band for the detection signal falls within 79 Hz to 81 Hz.

TABLE 7

| Azimuth | Anti-interference parameter |
| --- | --- |
| Azimuth 701 | Antenna 1, 76 Hz to 78 Hz |
| Azimuth 702 | Antenna 1, 79 Hz to 81 Hz |
| Azimuth 703 | Antenna 2, 76 Hz to 78 Hz |
| Azimuth 704 | Antenna 2, 79 Hz to 81 Hz |

Optionally, in this embodiment of this application, two or more of the transmit time period, the transmit moment, the transmit frequency band, the transmit waveform, the modulation code, and the antenna identifier may further be combined. To be specific, any anti-interference parameter may include any two or more parameters of the transmit time period, the transmit moment, the transmit frequency band, the transmit waveform, the modulation code, and the antenna identifier.

In an example, the transmit waveform and the transmit frequency band may be combined. To be specific, in the predefined rule, an anti-interference parameter corresponding to each azimuth includes both the transmit waveform and the transmit frequency band.

The four azimuths shown in FIG. 7 are still used as an example. In this case, two waveform libraries that are orthogonal to each other may be designed: a waveform library 1 and a waveform library 2. In addition, all the frequency bands available to the detection apparatus are divided into two transmit frequency bands: 76 Hz to 78 Hz and 79 Hz to 81 Hz. Then, the waveform libraries and the transmit frequency bands may be pairwise combined as an anti-interference parameter to obtain the predefined rule shown in Table 8.

TABLE 8

| Azimuth | Anti-interference parameter |
| --- | --- |
| Azimuth 1 | Waveform library 1, 76 Hz to 78 Hz |
| Azimuth 2 | Waveform library 1, 79 Hz to 81 Hz |
| Azimuth 3 | Waveform library 2, 76 Hz to 78 Hz |
| Azimuth 4 | Waveform library 2, 79 Hz to 81 Hz |

It should be noted that, when a quantity of the plurality of waveform libraries is the same as a quantity of the plurality of transmit frequency bands, because the waveform libraries and the transmit frequency bands may be pairwise combined, different anti-interference parameters may be obtained after the different waveform libraries and different transmit frequency bands are combined. Compared with that in a case of using only the waveform library or the transmit frequency band, a quantity of the obtained anti-interference parameters is increased to a product of the quantity of the plurality of waveform libraries and the quantity of the plurality of transmit frequency bands. Therefore, when the plurality of azimuths remain unchanged, a quantity of divided transmit frequency bands can be reduced, and a quantity of designed waveform libraries can be reduced, to reduce difficulty in designing waveform libraries that are orthogonal to each other.

In another example, the transmit time period and the transmit frequency band may be combined. To be specific, in the predefined rule, an anti-interference parameter corresponding to each azimuth includes both the transmit time period and the transmit frequency band. In this case, a quantity of the transmit time periods may be reduced, and similarly, a quantity of divided transmit frequency bands may also be reduced. Then, the transmit time periods and the transmit frequency bands may be randomly pairwise combined, to obtain a plurality of anti-interference parameters.

It should be noted that the foregoing merely uses an example in which each anti-interference parameter includes any two of the transmit time period, the transmit moment, the transmit frequency band, the transmit waveform, the modulation code, and the antenna identifier for description. In another possible case, each anti-interference parameter may further include any plurality of the transmit time period, the transmit moment, the transmit frequency band, the transmit waveform, the modulation code, and the antenna identifier. In other words, any plurality of the transmit time period, the transmit moment, the transmit frequency band, the transmit waveform, the modulation code, and the antenna identifier may be combined. This is not limited in this embodiment of this application.

Based on a same reason as the foregoing, any plurality of the transmit time period, the transmit moment, the transmit frequency band, the transmit waveform, the modulation code, and the antenna identifier are combined, that is, each anti-interference parameter includes the any plurality of the transmit time period, the transmit moment, the transmit frequency band, the transmit waveform, the modulation code, and the antenna identifier, to reduce difficulty in designing the anti-interference parameter, reduce time spent in designing the anti-interference parameter, and better resolve a problem of interference between the detection apparatuses.

Step 503: Transmit the detection signal based on the target anti-interference parameter.

After determining the target anti-interference parameter, the control device may send the target anti-interference parameter to the detection apparatus. Correspondingly, after receiving the target anti-interference parameter, the detection apparatus may transmit the detection signal based on the target anti-interference parameter.

In an example, when the target anti-interference parameter includes the identifier of the waveform library, after receiving the target anti-interference parameter, the detection apparatus may determine, from a plurality of waveform libraries stored in the detection apparatus, a waveform library indicated by the identifier, select any waveform from waveforms included in the waveform library, and transmit the detection signal based on the selected waveform.

Orientations of fields of view of a plurality of different detection apparatuses may fall within different azimuths. As a result, identifiers of waveform libraries included in target anti-interference parameters received by the plurality of detection apparatuses are different. Therefore, when transmitting detection signals, the plurality of detection apparatuses use different waveform libraries. Waveforms included in the different waveform libraries are orthogonal to each other. In this way, interference between the plurality of detection apparatuses can be avoided.

In another example, when the target anti-interference parameter includes the transmit time period, after receiving the target anti-interference parameter, the detection apparatus may transmit the detection signal and receive a reflected signal within the transmit time period.

Orientations of fields of view of a plurality of different detection apparatuses may fall within different azimuths. As a result, transmit time periods included in target anti-interference parameters received by the plurality of detection apparatuses are different. Therefore, when detection signals are transmitted, a detection apparatus transmits the detection signal and receives a reflected signal within a determined transmit time period, and another detection apparatus starts to transmit the detection signal and receive a reflected signal only when the transmit time period ends and another transmit time period arrives. In other words, the plurality of detection apparatuses do not transmit the detection signals and receive reflected signals at the same time. In this way, interference between the plurality of detection apparatuses can be avoided.

In another example, when the target anti-interference parameter includes the transmit moment, after receiving the target anti-interference parameter, the detection apparatus may transmit the detection signal at a moment indicated by the transmit moment.

Orientations of fields of view of a plurality of different detection apparatuses may fall within different azimuths. As a result, transmit moments included in target anti-interference parameters received by the plurality of detection apparatuses are different. Therefore, when transmitting detection signals, each detection apparatus transmits the detection signal at a different moment. In this way, interference between the plurality of detection apparatuses can be avoided.

In another example, when the target anti-interference parameter includes the transmit frequency band, after receiving the target anti-interference parameter, the detection apparatus may select any frequency from the transmit frequency band as a frequency of the detection signal, and transmit the detection signal.

Orientations of fields of view of a plurality of different detection apparatuses may fall within different azimuths. As a result, transmit frequency bands included in target anti-interference parameters received by the plurality of detection apparatuses are different. Therefore, when detection signals are transmitted, frequencies of the detection signals transmitted by the plurality of detection apparatuses are different. In this way, interference between the plurality of detection apparatuses can be avoided.

In another example, when the target anti-interference parameter includes the antenna identifier and the transmit frequency band, after receiving the target anti-interference parameter, the detection apparatus may select any frequency from the transmit frequency band, and then transmit the detection signal at the selected frequency through the antenna corresponding to the antenna identifier.

Orientations of fields of view of a plurality of different detection apparatuses may fall within different azimuths. As a result, antenna identifiers and transmit frequency bands that are included in target anti-interference parameters received by the plurality of detection apparatuses are incompletely the same. Therefore, when transmitting detection signals, the plurality of detection apparatuses may transmit the detection signals with different frequencies through antennas with a same polarization direction, and similarly, may transmit detection signals with a same frequency through antennas with different polarization directions, alternatively, may transmit detection signals with different frequencies through antennas with different polarization directions. In this way, interference between the plurality of detection apparatuses can be avoided.

In another example, when the target anti-interference parameter includes the identifier of the waveform library and the transmit frequency band, after receiving the target anti-interference parameter, the detection apparatus may determine, from the plurality of waveform libraries, a waveform library indicated by the identifier, and select any waveform from waveforms included in the waveform library, and selects any frequency from the transmit frequency band.

Then, the detection apparatus may transmit the detection signal at the selected frequency based on the selected waveform.

Orientations of fields of view of a plurality of different detection apparatuses may fall within different azimuths. As a result, identifiers of waveform libraries and transmit frequency bands that are included in target anti-interference parameters received by the plurality of detection apparatuses are incompletely the same. Therefore, when transmitting detection signals, the plurality of detection apparatuses may transmit detection signals with non-orthogonal waveforms and different frequencies, transmit detection signals with orthogonal waveforms and a same frequency, or transmit detection signals with orthogonal waveforms and different frequencies. In this way, interference between the plurality of detection apparatuses can be avoided.

In another example, when the target anti-interference parameter includes the transmit time period and the transmit frequency band, after receiving the target anti-interference parameter, the detection apparatus may determine a transmit start moment from the transmit time period, select any frequency from the transmit frequency band, and then transmit the detection signal at the selected frequency based on the selected transmit start moment.

Orientations of fields of view of a plurality of different detection apparatuses may fall within different azimuths. As a result, transmit time periods and transmit frequency bands included in target anti-interference parameters received by the plurality of detection apparatuses are incompletely the same. Therefore, when transmitting detection signals, the plurality of detection apparatuses may transmit detection signals with different frequencies and receive reflected signals with different frequencies within a same signal transmission time period, transmit detection signals with a same frequency and receive reflected signals with a same frequency within different signal transmission time periods, or transmit detection signals with different frequencies and receive reflected signals with different frequencies within different signal transmission time periods. In this way, interference between the plurality of detection apparatuses can be avoided.

In this embodiment of this application, the target anti-interference parameter is selected from the plurality of anti-interference parameters based on the orientation of the field of view of the detection apparatus and according to the predefined rule, and the plurality of anti-interference parameters are determined according to the predefined rule. Therefore, different orientations of the field of view of the detection apparatus indicate different selected target anti-interference parameters. Based on this, no interference is generated between detection signals transmitted by a plurality of detection apparatuses with different orientations of fields of view based on respective corresponding target anti-interference parameters. In this way, the detection apparatus can accurately receive the reflected signal after the detection signal transmitted by the detection apparatus encounters the obstacle, so that accuracy of a relative speed and a distance that are finally determined is relatively high. In addition, a plurality of parameters may be combined, to reduce design difficulty, also reduce design time, and better avoid interference between the detection apparatuses.

Figure 10:
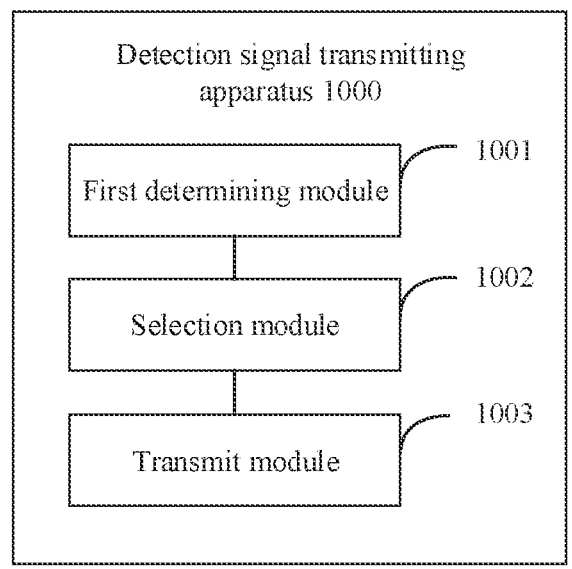
FIG. 10 is a schematic diagram of a structure of a detection signal transmitting apparatus according to an embodiment of this application.

FIG. 10 is a schematic diagram of a structure of a detection signal transmitting apparatus according to an embodiment of this application. The detection signal transmitting apparatus 1000 may be implemented as a part or all of a control device or a detection apparatus by using software, hardware, or a combination thereof. Refer to FIG. 10. The apparatus includes a first determining module 1001, a selection module 1002, and a transmit module 1003.

The first determining module 1001 is configured to perform an operation in step 501 in the embodiment in FIG. 5.

The selection module 1002 is configured to perform an operation in step 502 in the embodiment in FIG. 5.

The transmit module 1003 is configured to perform an operation in step 503 in the embodiment in FIG. 5.

Optionally, a predefined rule includes a correspondence between a first azimuth and a first anti-interference parameter, and the first anti-interference parameter is one of a plurality of anti-interference parameters.

The selection module 1002 is specifically configured to:
determine the first anti-interference parameter as a target anti-interference parameter when an orientation of a field of view of the detection apparatus falls within the first azimuth.

Optionally, two adjacent azimuths overlap.
The apparatus further includes:
a second determining module, configured to determine the first anti-interference parameter as the target anti-interference parameter when the orientation of the field of view of the detection apparatus changes and does not exceed a first threshold of a boundary of the first azimuth.

Optionally, two adjacent azimuths do not overlap. The predefined rule further includes a correspondence between a second azimuth and a second anti-interference parameter. The second anti-interference parameter is one of the plurality of anti-interference parameters other than the first anti-interference parameter.

The apparatus further includes:
a third determining module, configured to determine the second anti-interference parameter as the target anti-interference parameter when the orientation of the field of view of the detection apparatus changes and falls within the second azimuth.

Optionally, any one of the plurality of anti-interference parameters includes one or more of a transmit time period, a transmit moment, a transmit frequency band, a transmit waveform, a modulation code, and an antenna identifier.

When the any anti-interference parameter includes the modulation code, different modulation codes in a plurality of modulation codes included in the plurality of anti-interference parameters are orthogonal to each other, and each of the plurality of modulation codes is used to modulate a detection signal.

When the any anti-interference parameter includes the antenna identifier, polarization directions of antennas corresponding to different antenna identifiers in a plurality of antenna identifiers included in the plurality of anti-interference parameters are orthogonal to each other, and correspondingly, antennas corresponding to the plurality of antenna identifiers are disposed on the detection apparatus.

Optionally, a plurality of transmit time periods included in the plurality of anti-interference parameters are discontinuous when the any anti-interference parameter includes the transmit time period.

Optionally, a plurality of transmit moments included in the plurality of anti-interference parameters are discontinuous when the any anti-interference parameter includes the transmit moment.

Optionally, a plurality of transmit frequency bands included in the plurality of anti-interference parameters are discontinuous when the any anti-interference parameter includes the transmit frequency band.

In this embodiment of this application, the target anti-interference parameter is selected from the plurality of anti-interference parameters based on the orientation of the field of view of the detection apparatus and according to the predefined rule, and the plurality of anti-interference parameters are determined according to the predefined rule. Therefore, different orientations of the field of view of the detection apparatus indicate different selected target anti-interference parameters. Based on this, no interference is generated between detection signals transmitted by a plurality of detection apparatuses with different orientations of fields of view based on respective corresponding target anti-interference parameters. In this way, the detection apparatus can accurately receive a reflected signal after a detection signal transmitted by the detection apparatus encounters an obstacle, so that accuracy of a relative speed and a distance that are finally determined is relatively high. In addition, a plurality of parameters may be combined, to reduce design difficulty, also reduce design time, and better avoid interference between the detection apparatuses.

It should be noted that, when the detection signal transmitting apparatus provided in the foregoing embodiment transmits the detection signal, division into the foregoing function modules is merely used as an example for description. During actual application, the foregoing functions may be allocated to different function modules as required for implementation. To be specific, an internal structure of the apparatus is divided into different function modules, to complete all or some of the functions described above. In addition, the detection signal transmitting apparatus provided in the foregoing embodiment pertains to a same concept as the detection signal transmitting method embodiments. For a specific implementation process of the apparatus, refer to the method embodiments. Details are not described herein again.

All or some of the foregoing embodiments may be implemented by software, hardware, firmware, or any combination thereof. When software is used to implement the foregoing embodiments, all or some of the foregoing embodiments may be implemented in a form of a computer program product. The computer program product includes one or more computer instructions. When the computer instructions are loaded and executed on a computer, the procedure or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (Digital Subscriber Line, DSL)) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a digital versatile disc (Digital Versatile Disc, DVD)), a semiconductor medium (for example, a solid state disk (Solid State Disk, SSD)), or the like. It should be noted that the computer-readable storage medium mentioned in this application may be a non-volatile storage medium. In other words, the computer-readable storage medium may be a non-transitory storage medium.

The foregoing descriptions are merely embodiments of this application, but are not intended to limit this application. Any modification, equivalent replacement, or improvement made without departing from the spirit and principle of this application should fall within the protection scope of this application.

What is claimed is:

1. A detection signal transmitting method, wherein the method comprises:
    determining an orientation of a field of view of a detection apparatus;
    selecting one of a plurality of anti-interference parameters as a target anti-interference parameter based on the orientation of the field of view of the detection apparatus and according to a predefined rule, wherein the plurality of anti-interference parameters are determined according to the predefined rule, wherein each of the plurality of anti-interference parameters comprises a corresponding combination of a transmit time period and a transmit frequency band, wherein the predefined rule comprises correspondences between a plurality of azimuths and combinations of transmit time periods and transmit frequency bands, wherein a first azimuth and a second azimuth have an overlapping area, and wherein the selecting comprises:
    in response to determining that the orientation of the field of view of the detection apparatus is within the overlapping area and within a first threshold distance from a boundary of the first azimuth, determining, based on the correspondences, a first combination of a first transmit time period and a first transmit frequency band corresponding to the first azimuth as the target anti-interference parameter; and
    transmitting a detection signal based on the target anti-interference parameter.

2. The method according to claim 1, wherein the predefined rule comprises a correspondence between the first azimuth and a first anti-interference parameter, and the first anti-interference parameter is one of the plurality of anti-interference parameters, and wherein the selecting one of a plurality of anti-interference parameters as a target anti-interference parameter based on the orientation of the field of view of the detection apparatus and according to a predefined rule comprises:
    determining the first anti-interference parameter as the target anti-interference parameter in response to determining that the orientation of the field of view of the detection apparatus falls within the first azimuth.

3. The method according to claim 2, wherein two adjacent azimuths comprised in the predefined rule do not overlap, the predefined rule further comprises a correspondence between the second azimuth and a second anti-interference parameter, and the second anti-interference parameter is one of the plurality of anti-interference parameters other than the first anti-interference parameter, and wherein the method further comprises:
    determining the second anti-interference parameter as the target anti-interference parameter in response to determining that the orientation of the field of view of the detection apparatus changes and falls within the second azimuth.

4. The method according to claim 1, wherein each of the plurality of anti-interference parameters comprises one or more of a transmit moment, a transmit waveform, a modulation code, or an antenna identifier, and wherein:

when each of the plurality of anti-interference parameters comprises a corresponding modulation code, different modulation codes in a plurality of modulation codes comprised in the plurality of anti-interference parameters are orthogonal to each other, and each of the plurality of modulation codes is used to modulate the detection signal; or when each of the plurality of anti-interference parameters comprises a corresponding antenna identifier, polarization directions of antennas corresponding to different antenna identifiers in a plurality of antenna identifiers comprised in the plurality of anti-interference parameters are orthogonal to each other, and antennas corresponding to the plurality of antenna identifiers are disposed on the detection apparatus.

5. The method according to claim 4, wherein the transmit time periods comprised in the plurality of anti-interference parameters are discontinuous.

6. The method according to claim 4, wherein a plurality of transmit moments comprised in the plurality of anti-interference parameters are discontinuous when each of the plurality of anti-interference parameters comprises a corresponding transmit moment.

7. The method according to claim 4, wherein the transmit frequency bands comprised in the plurality of anti-interference parameters are discontinuous when each of the plurality of anti-interference parameters comprises a corresponding transmit frequency band.

8. A detection signal transmitting method, wherein the method comprises:

determining a detection signal based on a target anti-interference parameter, wherein the target anti-interference parameter is one of a plurality of anti-interference parameters, wherein the target anti-interference parameter is selected based on an orientation of a field of view of a detection apparatus and a predefined rule, wherein the plurality of anti-interference parameters are determined according to the predefined rule, wherein each of the plurality of anti-interference parameters comprises a corresponding combination of a transmit time period and a transmit frequency band, wherein the predefined rule comprises correspondences between a plurality of azimuths and combinations of transmit time periods and transmit frequency bands, wherein a first azimuth and a second azimuth have an overlapping area, and wherein the determining comprises:

in response to determining that the orientation of the field of view of the detection apparatus is within the overlapping area and within a first threshold distance from a boundary of the first azimuth, determining, based on the correspondences, a first combination of a first transmit time period and a first transmit frequency band corresponding to the first azimuth as the target anti-interference parameter; and transmitting the detection signal.

9. The method according to claim 8, wherein the predefined rule comprises a correspondence between the first azimuth and a first anti-interference parameter, and the first anti-interference parameter is one of the plurality of anti-interference parameters, and wherein the target anti-interference parameter is the first anti-interference parameter when the orientation of the field of view of the detection apparatus falls within the first azimuth.

10. The method according to claim 9, wherein two adjacent azimuths comprised in the predefined rule do not overlap, the predefined rule further comprises a correspondence between the second azimuth and a second anti-interference parameter, and the second anti-interference parameter is one of the plurality of anti-interference parameters other than the first anti-interference parameter, and wherein the target anti-interference parameter is the second anti-interference parameter when the orientation of the field of view of the detection apparatus changes and falls within the second azimuth.

11. The method according to claim 8, wherein each of the plurality of anti-interference parameters comprises one or more of a transmit moment, a transmit waveform, a modulation code, or an antenna identifier.

12. An apparatus, comprising:
one or more processors; and
a non-transitory computer-readable storage medium storing program instructions, wherein, when executed by the one or more processors, the program instructions cause the apparatus to:

determine an orientation of a field of view of a detection apparatus;

select one of a plurality of anti-interference parameters as a target anti-interference parameter based on the orientation of the field of view of the detection apparatus and according to a predefined rule, wherein the plurality of anti-interference parameters are determined according to the predefined rule, wherein each of the plurality of anti-interference parameters comprises a corresponding combination of a transmit time period and a transmit frequency band, wherein the predefined rule comprises correspondences between a plurality of azimuths and combinations of transmit time periods and transmit frequency bands, wherein a first azimuth and a second azimuth have an overlapping area, and wherein selecting one of the plurality of anti-interference parameters as the target anti-interference parameter comprises:

in response to determining that the orientation of the field of view of the detection apparatus is within the overlapping area and within a first threshold distance from a boundary of the first azimuth, determining, based on the correspondences, a first combination of a first transmit time period and a first transmit frequency band corresponding to the first azimuth as the target anti-interference parameter; and transmit a detection signal based on the target anti-interference parameter.

13. The apparatus according to claim 12, wherein the predefined rule comprises a correspondence between the first azimuth and a first anti-interference parameter, and the first anti-interference parameter is one of the plurality of anti-interference parameters, and wherein the selecting one of a plurality of anti-interference parameters as a target anti-interference parameter based on the orientation of the field of view of the detection apparatus and according to a predefined rule comprises:

determining the first anti-interference parameter as the target anti-interference parameter in response to determining that the orientation of the field of view of the detection apparatus falls within the first azimuth.

14. The apparatus according to claim 13, wherein two adjacent azimuths comprised in the predefined rule do not overlap, the predefined rule further comprises a correspondence between the second azimuth and a second anti-interference parameter, and the second anti-interference parameter is one of the plurality of anti-interference parameters other than the first anti-interference parameter, and wherein the program instructions, when executed by the one or more processors, cause the apparatus to:

determine the second anti-interference parameter as the target anti-interference parameter in response to determining that the orientation of the field of view of the detection apparatus changes and falls within the second azimuth.

15. The apparatus according to claim 12, wherein each of the plurality of anti-interference parameters comprises one or more of a transmit moment, a transmit waveform, a modulation code, or an antenna identifier, and wherein:

when each of the plurality of anti-interference parameters comprises a corresponding modulation code, different modulation codes in a plurality of modulation codes comprised in the plurality of anti-interference parameters are orthogonal to each other, and each of the plurality of modulation codes is used to modulate the detection signal; or when each of the plurality of anti-interference parameters comprises a corresponding antenna identifier, polarization directions of antennas corresponding to different antenna identifiers in a plurality of antenna identifiers comprised in the plurality of anti-interference parameters are orthogonal to each other, and antennas corresponding to the plurality of antenna identifiers are disposed on the detection apparatus.

16. The apparatus according to claim 15, wherein the transmit time periods comprised in the plurality of anti-interference parameters are discontinuous.

17. The apparatus according to claim 15, wherein a plurality of transmit moments comprised in the plurality of anti-interference parameters are discontinuous when each of the plurality of anti-interference parameters comprises a corresponding transmit moment.

18. The apparatus according to claim 15, wherein the transmit frequency bands comprised in the plurality of anti-interference parameters are discontinuous when each of the plurality of anti-interference parameters comprises a corresponding transmit frequency band.

* * * * *